US005132717A

United States Patent [19]

Ceisel

[11] Patent Number: 5,132,717

[45] Date of Patent: Jul. 21, 1992

[54] FILM PROCESSOR

[76] Inventor: Joseph R. Ceisel, 1939 Linneman St., Glenview, Ill. 60025

[21] Appl. No.: 638,126

[22] Filed: Jan. 7, 1991

[51] Int. Cl.[5] .............................................. G03B 3/08

[52] U.S. Cl. .................................... 354/322; 354/320

[58] Field of Search ............... 354/338, 324, 319, 322, 354/320, 323, 345, 340, 316, 315

[56] References Cited

U.S. PATENT DOCUMENTS

| | | | |
|---|---|---|---|
| 2,214,925 | 9/1940 | Gutrie | 134/75 |
| 3,033,710 | 5/1962 | Hightower et al. | 134/75 |
| 3,270,860 | 9/1966 | Siebach | 198/179 |
| 3,512,467 | 5/1970 | Schafler | 354/322 |
| 3,882,525 | 5/1975 | Zwettler | 354/316 |
| 4,125,852 | 11/1978 | Brooks | 354/322 |
| 4,531,821 | 7/1985 | Mears | 354/320 |

*Primary Examiner*—L. T. Hix
*Assistant Examiner*—D. Rutledge
*Attorney, Agent, or Firm*—Marshall, O'Toole, Gerstein, Murray & Bicknell

[57] ABSTRACT

A processor for developing film chips is provided which comprises a series of tanks for developer solutions and coil means for transporting film may be suspended wherein the axis of the coil is vertically disposed above each of the series of tanks. The processor further comprises means for rotating the coil about its central axis wherein when the coil is rotated a film carrier suspended from the coil is capable of being transported in the axial direction of the coil. The coil transport means further comprises one or more deviations in its shape capable of vertically displacing a film carrier suspended from the coil from its axial direction of travel when the coil is rotated. The shape of the coil and its deviations are such that film held by the carrier is capable of being successively transported to and immersed in developer solutions contained in one or more of the series of tanks.

7 Claims, 2 Drawing Sheets

10
12
14
16
17
18
20
22
24
25
26
28
29
30
32
34
36
38
40
100
102
104
106
110
112
114
116
118
120

FILM PROCESSOR

BACKGROUND OF THE INVENTION

The present invention relates generally to devices for film processing and more specifically to devices for automatic processing of dental X-ray film chips.

Various devices are known for automatic transport and processing of solid objects in fluid baths. Of interest is Siebach, U.S. Pat. No. 3,270,860, which discloses a geared apparatus for transporting articles to be cleaned through a plurality of processing stations. The items to be transported are affixed to a continuous length of corrugated ribbon along a closed loop path and are transported to a plurality of processing stations including solution tanks. Other devices for processing of objects in fluid baths include those such as disclosed by Guthrie, U.S. Pat. No. 2,214,925, and Hightower, U.S. Pat. No. 3,033,710.

Devices specifically known in the art for processing of X-ray film chips include those such as disclosed by Schafler, U.S. Pat. No. 3,512,467. Schafler relates to an X-ray film developer comprising a plurality of fluid containing tanks, each of which has a rotatably mounted drum therein, each drum being provided with a spiral belt accepting groove. The device further comprises a continuous, flexible, resilient belt which is wound around each of the drums and which contains slits for holding X-ray film chips. As the belt is rotated, it drives each of the rotating drums and film chips attached thereto are sequentially exposed to the fluid baths and to a drying chamber.

Zwettler, U.S. Pat. No. 3,882,525, discloses a film processor for dental X-ray film comprising a pair of laterally disposed, vertically spaced parallel walls or tracks forming a continuously curved channel with three loops. The downwardly extending curved portions of the loops extend into tanks comprising film processing chemicals in the development compartment of the processor. The inside surfaces of the pair of walls are provided with a pair of vee-grooves which form a pathway for engaging the opposite sides of a film chip. Film chips to be processed in the apparatus are permitted to drop by gravity along the downwardly extending portions of the path and are pushed by synchronized rotating bars along the upwardly extending portions of its path. Brooks, U.S. Pat. No. 4,125,852, discloses a dental film carriage useful for conveying odd sized dental film chips in the device of Zwettler.

Mears, U.S. Pat. No. 4,531,821, discloses a device for transporting dental film chips comprising two driven gears having pivotally attached cranks at pivot points maintained at the same elevation as the gears rotate. The upper ends of the cranks are attached to a horizontal moving guide bar. Film chips are transported by the mechanism along a fixed guide plate having a number of spaced vertical slots from which film chips advance into developing tanks.

Despite the various film processing devices known to the art, there remains a need for a reliable, mechanically simple device for carrying out automatic processing of film chips.

SUMMARY OF THE INVENTION

The present invention relates to an improved simplified device for automatic processing of film chips and particularly dental X-ray film chips and methods for its use. The invention provides a film processing device comprising a coil means for transporting film chips to one or more of a series of tanks containing film processing chemicals. Specifically, the device comprises a series of tanks; coil means for transporting film clips comprising a rigid generally helical coil from which a film carrier may be suspended wherein the axis of the coil is vertically disposed above each of said series of tanks. The device further comprises means for rotating said coil about its central axis wherein when said coil is rotated a film carrier which is suspended from said coil is transported in the axial direction of the coil. The coil transport means further comprises one or more deviations in its shape which are capable of displacing a film carrier from its axial direction of travel when said coil is rotated. The shape of the coil and its deviations are selected such that a film chip held by a film carrier suspended from said coil is capable of being successively transported to and immersed in developer chemicals contained in one or more of the series of tanks.

DETAILED DESCRIPTION

The film processor of the invention comprises a series of tanks containing film developer solutions. Such solutions typically include a developer, a fixer and a rinse but can include other solutions. The developer solutions are preferably maintained at a controlled temperature by heating and thermostat means and the processor is preferably enclosed or is situated in a dark room in order to prevent exposure of the film chips to light. Film chips to be processed are loaded onto the coiled transport means of the invention and are transported sequentially from one tank to another where they are immersed in each of the solutions for controlled periods of time. After the final solution contacting or rinsing step, the film chips are transported to a drying and/or an unloading station from which they can be removed by an operator.

Figures 1, 7A, 7B, 8A, 8B:
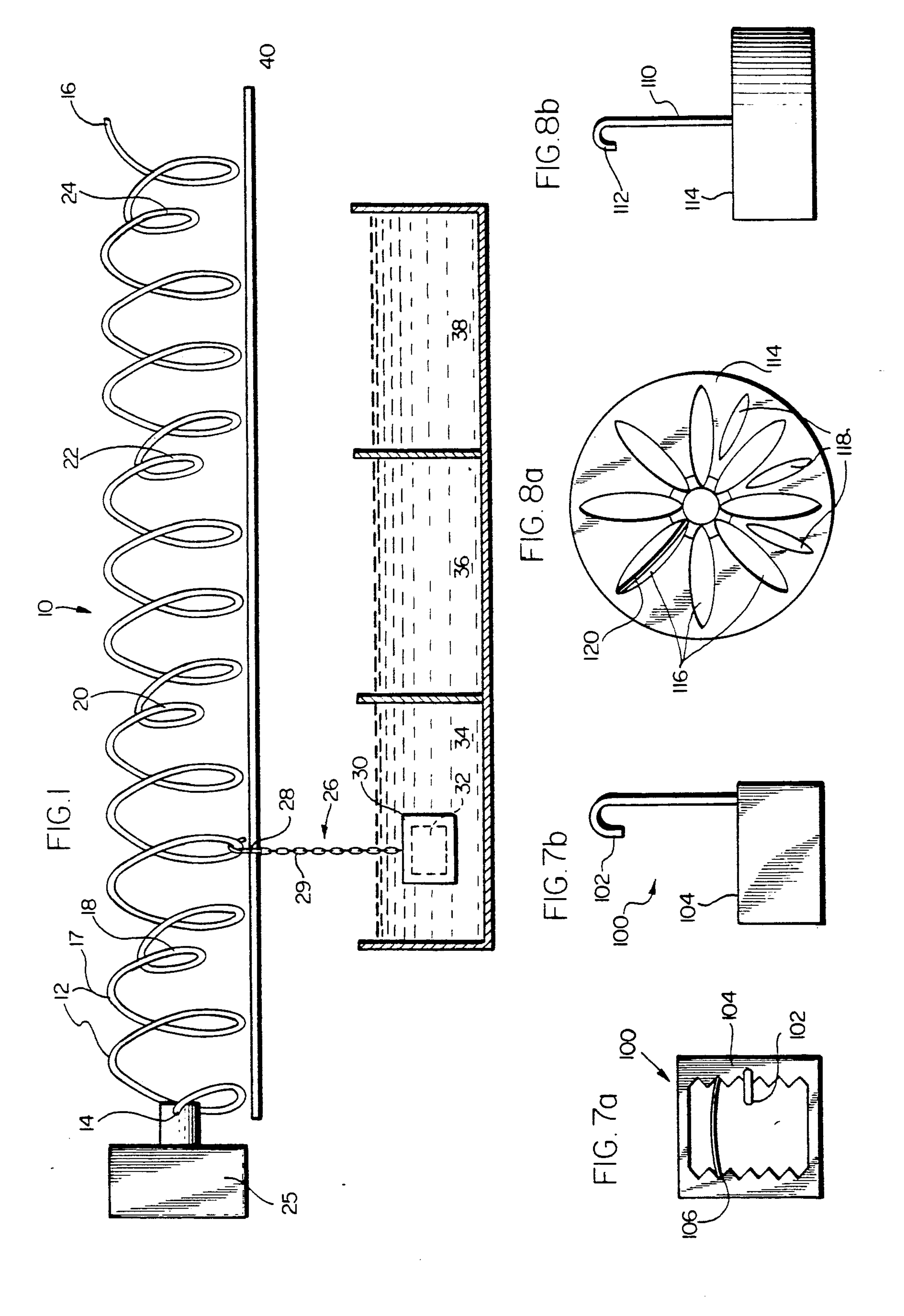
FIG. 1. is a diagrammatic view of the film processor.
FIG. 7*a* is a top view of a film carrier having a rectangular film basket.
FIG. 7*b* is an end view of a film carrier having a rectangular film basket.
FIG. 8*a* is a top view of a film carrier having a round film basket.
FIG. 8*b* is an end view of a film carrier having a round film basket.
Figure 2A:
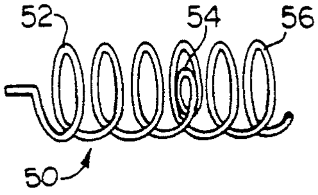
FIGS. 2*a*, 2*b* and 2*c* are oblique, end and side views, respectively, of the coil transport means comprising a deviation in its shape which is a single tight loop within a larger coil.
Figure 2B:
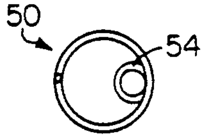
Figure 2C:
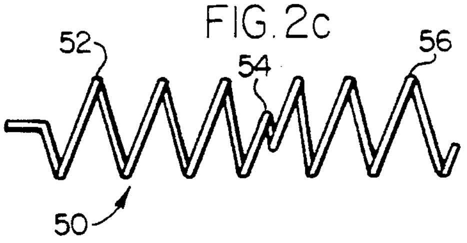

Referring to FIG. 1, the film processor device 10 comprises a rigid generally helical coil 12. The coil can be produced from a variety of materials including metal and plastic but is preferably a rigid metal rod wound into multiple helical coils about a central axis. While it is preferred that the coil be capable of maintaining its shape when supported by only its two ends, it can also be supported along all or nearly all of its length by one or more support rods 40 which can be positioned below and outside the circumference of the coil or at the top of and within the outside diameter of the coil. The coil means 12 comprises a first end 14 and a second end 16 which could optionally be straight and define the axis of rotation for the coil. In FIG. 1, a means for rotating the coil about its central axis 25 (preferably an electric motor) is disclosed attached to first end 14 but may be disposed at the second end 16.

The coiled transport means 12 comprises multiple helical coils such as coil 17 proceeding longitudinally about a central axis. Coil 17 comprises a deviation in its shape which is a tight loop 18 within the larger coil. The coiled transport means comprises other tight loop deviations 20, 22 and 24 along its length. Suspended from the coil transport means is a film carrier 26 comprising a coil attachment means 28 which is a hook, a chain 29 and a film basket 30 into which a film chip 32 to be processed is deposited. The processor also comprises tanks 34, 36 and 38 containing film developer solutions which are generally disposed underneath the center axis of the coil. It should be noted that in FIG. 1, the center axis of the helical coil 12 is horizontally level as are each of the developer solution tanks 34, 36 and 38 in relation to each other. While this is the preferred orientation of the coil means and the tanks for practice of the invention, it is possible to practice the invention in a manner where the central axis of the coil means is inclined upwards or downwards with the series of tanks correspondingly stepped upwards or downwards.

Suitable film carriers for use with the film processing apparatus are illustrated in FIGS. *7a* and *7b* and FIGS. *8a* and *8b*. FIGS. *7a* and *7b* disclose a film carrier 100 comprising a coil attachment means 102 which is a hook and a rectangular film basket 104 which contains a single film chip 106. FIGS. *8a* and *8b* disclose a film carrier 110 with a coil attachment means 112 and a circular film basket 114. The circular film basket 114 comprises numerous large 116 and small 118 slots for film chips such as film chip 120. The vertical member of the film carriers can be either rigid or flexible and can comprise materials including but not limited to chains, rods or braids.

According to a method of operating the processor device of FIG. 1, a film chip 32 is deposited in the film basket 30 of film carrier 26 and the film carrier is suspended from the first end 14 of the coiled transport means. As the coil 12 is rotated by the coil rotating means 25, the coil attachment means 28 is propelled in the axial direction down the length of the coil while the film basket 30 rests against the outside of the first tank 34. The coil attachment means 28 is then raised by loop 18 effectively lifting the film carrier 26 including the film basket 30 over tank 34. The film carrier 26 is then lowered by loop 18 to the bottom of the next coil 19 such that the film basket 30 and film chip 32 are lowered into tank 34 containing the first developer solution. As the coil 12 continues to rotate, the film carrier 26 is transported in an axial direction along the length of the coil and the film chip 32 is passed through the length of the first tank 34. As the coil attachment means 28 is transported along the coil 12, it encounters tight loop 20 which functions to lift the film carrier to the top diameter of the coil and continues to transport the film carrier laterally. This deviation in the shape of the coil 12 functions to lift the film carrier 26 and film chip 32 out of the first developer tank 34 and transport it to above the second developer tank 36. As the coil continues to rotate and the tight loop 20 reaches the bottom of the coil, the film chip 32 is lowered into the second developer tank 36. It should be noted that in FIG. 1, the deviations in the coil transport means are illustrated as being laterally disposed from a position directly above the walls separating adjacent tanks. This is because it is generally preferred for the film carrier to slide up the inside wall of a first tank and swing by gravity to a point above a second adjacent tank before it is lowered into that second tank.

The film chip is then transported laterally through the length of the second developer tank 36 and is lifted and transported laterally by tight loop 22 into the third developer tank 38. This process is repeated until tight loop 24 removes the carrier 26 and film chip 32 from the third developer tank 38 and transports the film and carrier to the second end of the coiled transport means where it can drop off the end into a drying area. Optionally, the second end can comprise a straight, uncoiled section where the film and carrier may be dried and can remain during rotation of the coil until removed by an operator for observation.

The coil transporting means is designed comprising deviations in its shape capable of displacing a film carrier vertically from its axial direction of travel so as to lower and lift a film carrier into and out of developer solution tanks. Suitable deviations in the coil shape for displacing the film carrier vertically from its axial direction of travel include a coil segment at the outer diameter of the coil and extending essentially parallel to the long axis of the coil; a coil segment extending essentially radially toward the center of the coil; a coil segment extending essentially radially away from the center of the coil; a coil segment providing a helical coil with a smaller diameter than the maximum diameter of the coiled transporting means; with a single tight loop at the periphery of a larger coil being particularly preferred. Other deviations and various combinations of the above deviations which would be apparent to one of ordinary skill in the art may also be used.

Referring to FIGS. *2a*, *2b* and *2c*, a coil transport means according to the invention comprises a first coil section 52 and a deviation in its shape which is a single tight loop 54 with the larger coil. As the coil 50 is rotated about its axis, a film carrier suspended from the coil would be transported in the axial direction of the coil along a first helical coil section 51 until it encounters tight loop 54. The film carrier would then be displaced sideways and vertically upward by the tight loop as it continues its axial travel before being lowered downward after one complete rotation of the coil. The film carrier would then continue its travel along a second helical coil section 56. This embodiment of the coiled transport means permits exterior support of the coil by means of supporting rods or the like. According to a preferred embodiment of the invention, the pitch of the tight loop 54 (i.e., the axial distance travelled in one rotation of the coil) is increased over that of the coil 52 disposed above the developer solution tanks in order to more rapidly transport the film to be processed from one developer solution tank to another.

Figure 3A:
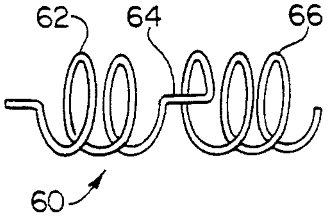
FIGS. 3*a*, 3*b* and 3*c* are oblique, end and side views, respectively, of the coil transport means comprising a deviation in its shape which is a coil segment at the outer diameter of the coil and extending essentially parallel to the long axis of the coil.
Figure 3B:
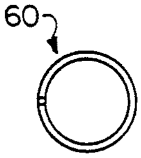
Figure 3C:
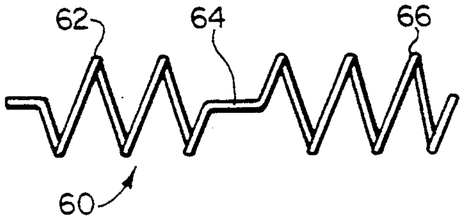

Referring to FIGS. 3*a*, 3*b* and 3*c*, a coil transport means 60 according to the invention comprises a first helical coil section 62 and a deviation in its shape 64 which comprises a coil segment at the outer diameter of the coil and extending essentially parallel to the long axis of the coil. As the coil 60 is rotated about its axis, a film carrier suspended from the coil would be transported in the axial direction of the coil along the first helical coil section 62 until it encounters the coil segment 64. The film carrier would then be displaced vertically upward by the coil segment 64 and then axially by an additional guide within the processor unit. One embodiment of such a guide is a series of inclined planes which would advance the carrier axially as the hook of the carrier is raised and contacts one of the planes. The film carrier would continue its axial travel and would be lowered downward after one complete rotation of the coil. The film carrier would then continue its travel axially along a second helical coil section 66. This embodiment of the coiled transport means permits exterior or interior support of the coil by means of supporting rods or the like.

Figure 4A:
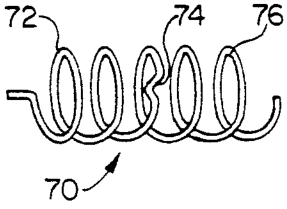
FIGS. 4*a*, 4*b* and 4*c* are oblique, end and side views, respectively, of the coil transport means comprising a deviation in its shape which is a coil segment extending radially inward toward the center axis of the coil.
Figure 4B:
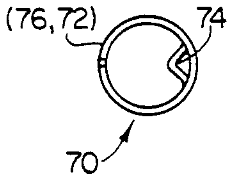
Figure 4C:
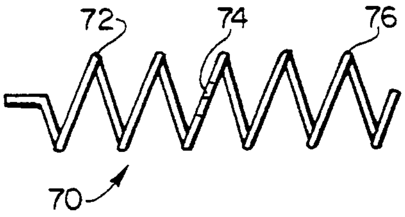

Referring to FIGS. 4*a*, 4*b* and 4*c*, a coil transport means 70 according to the invention comprises a first helical coil section 72 and a deviation in its shape 74 which is a coil segment extending radially inward toward the center axis of the coil. As the coil 70 is rotated along its axis, a film carrier suspended from the coil would be transported in the axial direction of the coil along the first coil section 72 until it encountered the coil segment 74. The film carrier would then be displaced sideways and vertically upward by the radial inward coil deviation 74 as it is transported axially. The film carrier would then be lowered downward after one complete rotation of the coil and continue its travel axially along a second helical coil section 76. This embodiment of the coiled transport means permits exterior support of the coil by means of supporting rods or the like.

Figure 5A:
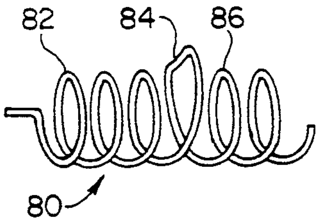
FIGS. 5*a*, 5*b* and 5*c* are oblique, end and side views, respectively, of the coil transport means comprising a deviation in its shape which is a coil segment extending radially outward away from the center axis of the coil.
Figure 5B:
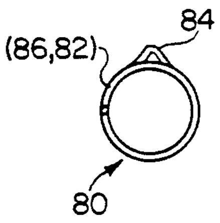
Figure 5C:
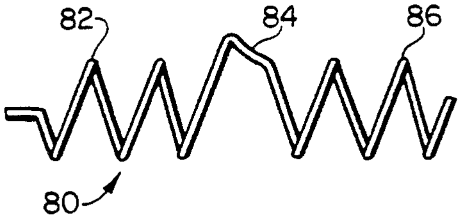

Referring to FIGS. 5*a*, 5*b* and 5*c*, a coil transport means 80 according to the invention comprises a first helical section 82 and a deviation in its shape 84 which is a coil segment extending radially outward away from the center axis of the coil and then almost parallel to the long axis. As the coil 80 is rotated along its axis, a film carrier suspended from the coil would be transported in the axial direction along the first coil section 82 until it encountered coil section 84. The film carrier would then be displaced sideways and vertically upward by the radial outward coil deviation 84 as it is transported axially. The film carrier would then be lowered downward after one complete rotation of the coil and would continue its travel axially along a second helical coil section 88. This embodiment of the coil transport means permits interior support of the coil by means of supporting rods or the like.

Figure 6A:
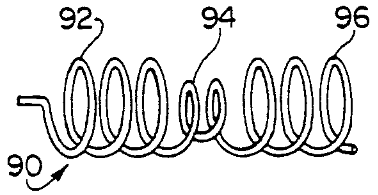
FIGS. 6*a*, 6*b* and 6*c* are oblique, end and side views, respectively, of the coil transport means comprising a deviation in its shape which is a second helical coil section with a diameter smaller than that of the coil which immediately precedes or follows it.
Figure 6B:
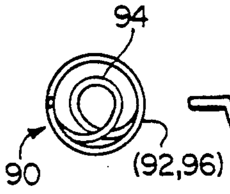
Figure 6C:
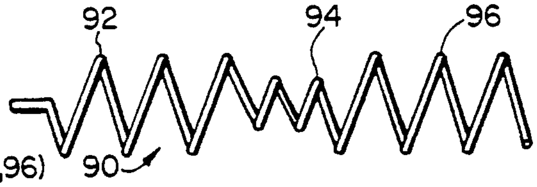

Referring to FIGS. 6*a*, 6*b* and 6*c*, a coil transport means 90 according to the invention comprises a first helical coiled section of constant diameter 92 and a second helical coiled section 94 with a smaller diameter than the first helical coiled section followed by a third helical coiled section of constant diameter 96. As the coil 90 is rotated along its axis, a film carrier suspended from the coil would be transported in the axial direction along the first coil section 92 until it reaches coil section 94. The film carrier would then be displaced vertically upward as the diameter of the helical coil section 94 decreases. As the coil continues to rotate, the film carrier would continue to move axially and would be lowered downward as the diameter of the helical coil section 94 increases until it reaches coil section 96 of constant diameter. This embodiment of the coiled transport means permits exterior support of the coil by means of exterior supporting rods or the like. As noted previously, other deviations and modifications and combinations of the above deviations would be apparent to those of ordinary skill in the art and may be used in practice of the invention.

While the speed of the coil rotation means can be programmed so as to control the duration of immersion of the film chips in each of the developer solution tanks, it is preferred that the duration of immersion and film processing steps be controlled by providing variations in the shape of the coil transport means. As one example, the pitch of the coil means may be adjusted so as to provide longer or shorter immersion times in each of the developer solution tanks. Specifically, if a longer immersion time is desired, the pitch of the coil may be reduced. Conversely, the pitch can be increased where a shorter immersion time is desired. In addition, the pitch of the coil can be increased in the coil deviations for vertically displacing the film carrier when it is desired that the film carrier and film chip be rapidly moved from one developer solution tank to another.

Numerous variations and embodiments of the above-described invention will be apparent to one of ordinary skill in the art in light of the description provided above. As one example, the film carrier to be suspended from the coiled rod can be designed in a variety of manners and can comprise either a solid bar or flexible chain suspended from a hook. In addition, the walls of the solution tanks can be designed so as to support and guide the film carriers as they are transported from one tank to another. Other variations will be apparent to those of ordinary skill in the art. Accordingly, only such limitations as appear in the appended claims should be placed thereon.

I claim:

1. A processor for film chips comprising:

a series of tanks;

coil means for transporting film chips comprising a rigid generally helical coil from which a film carrier may be suspended wherein the central axis of said coil is vertically disposed above each of said series of tanks; and means for rotating said coil about its central axis wherein when said coil is rotated a film carrier which is suspended from said coil is capable of being transported in the axial direction of the coil;

said coil transport means further comprising one or more deviations in its shape capable of vertically displacing a film carrier suspended from said coil from its axial direction of travel when said coil is rotated;

wherein the shape of the coil and its deviations are selected such that a film chip held by a film carrier suspended from said coil is capable of being successively transported to and immersed in developer solutions contained in one or more of said series of tanks.

2. The processor of claim 1 wherein said deviation in the shape of the coil transport means comprises a single tight loop within a larger coil.

3. The processor of claim 1 wherein said deviation in the shape of the coil transport means comprises a coil segment at the outer diameter of the coil and extending essentially parallel to the long axis of the coil.

4. The processor of claim 1 wherein said deviation in the shape of the coil transport means comprises a coil segment extending radially toward the center of the coil.

5. The processor of claim 1 wherein said deviation in the shape of the coil transport means comprises a coil segment extending radially away from the center of the coil.

6. The processor of claim 1 wherein said deviation in the shape of the coil transport means comprises a coil segment providing a helical coil with a smaller diameter than that which immediately precedes or follows it.

7. A method for developing film chips comprising the steps of:

placing a film chip to be developed in a film carrier;

suspending the film carrier from a coil means for transporting film chips, said coil means comprising a rigid generally helical coil wherein the central axis of said coil is vertically disposed above each of a series of tanks containing developer solutions and wherein the coil comprises one or more deviations in its shape capable of vertically displacing the film carrier from its axial direction of travel when the coil is rotated; and rotating said coil about its central axis and transporting said film carrier in the axial direction of the coil and thereby sequentially immersing said film chip in a series of developer solutions.

* * * * *